United States Patent [19]

Loggins

[11] Patent Number: 4,926,564

[45] Date of Patent: May 22, 1990

[54] TRIANGULAR DRAFTING INSTRUMENT

[75] Inventor: C. J. Loggins, Sheboygan, Wis.

[73] Assignee: Mayline Company, Inc., Sheboygan, Wis.

[21] Appl. No.: 290,744

[22] Filed: Dec. 27, 1988

[51] Int. Cl.[5] .................... G01B 3/00

[52] U.S. Cl. .................... 33/474; 33/489; 33/484

[58] Field of Search .................... 33/429, 474, 476, 479, 33/480, 482, 489, 484

[56] References Cited

U.S. PATENT DOCUMENTS

| | | | |
|---|---|---|---|
| 343,616 | 6/1986 | Upson et al. | 33/474 |
| 699,738 | 5/1902 | Zange | 33/482 |
| 2,364,529 | 12/1944 | Hill | 33/474 |

FOREIGN PATENT DOCUMENTS

| | | | |
|---|---|---|---|
| 1385750 | 12/1964 | France | 33/474 |
| 205209 | 9/1939 | Switzerland | 33/429 |

*Primary Examiner*—Harry N. Haroian
*Attorney, Agent, or Firm*—Ronald B. Sefrna

[57] ABSTRACT

The drafting instrument of the invention generally comprises a triangular integrally formed substantially planar construction having three perimeter legs, interconnected end to end to form the triangular configuration and define an open space in the interior of the body, and one interior leg extending across the open space to form interior complementary angles to the angles formed at the respective intersections of the perimeter legs. The instrument is provided in two primary embodiments, the first adapted as a 30/60 degree triangular instrument and the second as a 45 degree triangular instrument. The instrument includes a plurality of glide points extending outwardly from one or both faces of the instrument to support the instrument slightly above the surface upon which it is used, and further includes a handle assembly disposed near the intersection of two of the perimeter legs of the instrument. In the preferred embodiments of the invention the handle is slideably disposed in an aperture and retained therein by thin end caps, allowing the handle to slide freely through the aperture in a direction perpendicular to the plane of the instrument.

19 Claims, 2 Drawing Sheets

TRIANGULAR DRAFTING INSTRUMENT

FIELD OF THE INVENTION

The present invention generally relates to the field of drafting instruments, and in its preferred embodiments relates to a triangular drafting instrument primarily intended for use in conjunction with a T-square or horizontal bar, establishing limited contact between the instrument and the drafting surface, providing a handle for ease of use, and combining the capability of efficiently establishing complementary angles with minimal manipulation of the instrument.

BACKGROUND OF THE INVENTION

The two most common operations in the practice of drafting are the scribing of horizontal and vertical lines relative to the orientation of the drafting work or drawing. Horizontal lines are generally produced with the use of a T-square or horizontal bar, and vertical lines are generally produced with the use of a right triangle in conjunction with a T-square or horizontal bar. Such triangles are also generally used to produce lines at the commonly needed angles of 30 degrees, 45 degrees, or 60 degrees from the horizontal, and are commonly available in 30–60 degree and 45 degree models. Despite their almost universal use, such triangles are subject to several disadvantages and problems, especially when used for the production of vertical lines.

The majority of those problems stem from the full contact between the extensive surface area of the face of the triangle and the drawing surface and the difficulty of grasping a triangle which is flat upon the drawing surface in order to flip it from face to face. The full contact between the face of the triangle and the drawing surface often produces smearing of both graphite or ink lines on the drawing if the triangle is slid over those lines, so it is necessary for the draftsman to position the triangle so that it is not disposed directly over at least the most recently performed work. This necessity often creates strained working positions and reduces the efficiency of the draftsman. These problems are exacerbated by the need for the draftsman to reposition the standard drafting triangles in order to scribe complimentary or reverse angles.

In addition, the use of graphite pencils and the use of erasers leaves graphite and eraser residue on the drafting surface, which accumulates along the working edge of the T-square or horizontal bar at the surface of the drawing. As a triangle is slid along that edge of the horizontal bar the edge of the triangle is in contact with the residue, increasing the drag between the contiguous edges of the two instruments and increasing the probability of creating graphite smears on the drawing surface.

Various approaches to solution of these problems have been attempted and are known in the prior art, but none of the approaches have fully addressed the combination of problems, and none have presented a coordinated solution. L-shaped drafting instruments, as illustrated by British Patent No. 386,883 and French Patent No. 730,763, are known in the art and do serve to alleviate some of the problems associated with the standard drafting triangle. Those instruments are, however, primarily directed to the purpose of providing an instrument capable of creating certain specific angles or scribing lines of a certain specific length. Similarly, various triangle designs have been proposed, such as those illustrated by U.S. Pat. Ser. No. 482,023 and U.S. Pat. Ser. No. 4,545,130, for the primary purpose of providing an instrument capable of creating a multiplicity of different angles and curves.

French Patent No. 1,385,756 discloses the use of raised points on the face of a T-square or triangle to raise the instrument above the surface of the drafting work, which alleviates certain of the normal disadvantages of the use of a triangular instrument, but the design stops short of a coordinated solution to the full scope of problems associated with a triangular instrument.

The use of a handle extending outwardly from at least one face of a drafting instrument has also been previously proposed, as in U.S. Pat. Ser. No. 831,314, U.S. Pat. Ser. No. 699,738, and U.S. Pat. Ser. No. 2,364,529. These designs are useful in providing a means of more readily grasping the drafting instrument with which they are used, but again do not address the full scope of problems or provide a coordinated solution.

It is an object of the present invention to provide a fully coordinated approach to solution of the problems associated with the use of a standard drafting triangle without negating the advantageous features of a triangular drafting instrument, and it is a further object of the present invention to provide a triangular drafting instrument with a combination of features directed to performance of drafting work in a highly efficient manner.

SUMMARY OF THE INVENTION

Each of the drafting instrument embodiments of the invention generally comprises a triangular integrally formed substantially planar body having three elongate perimeter legs interconnected at their ends to form the triangular configuration of the body and to define an open space in the interior of the body. In the preferred embodiment of the invention the two edges of each perimeter leg are parallel, and the width of each perimeter leg is equal to the wIdth of the others. The body of each instrument is configured as a right triangle, with the length of the perimeter legs of each instrument adapted to form either a 30/60 degree triangle embodiment or a 45 degree triangle embodiment. The body of each instrument further includes an elongate interior leg interconnected between the intersection of the two perimeter legs forming the right angle of the body and the perimeter leg forming the hypotenuse of the triangle through the open space defined by the perimeter legs of the instrument.

Each embodiment of the instrument of the invention includes a plurality of small glide points extending outwardly from one or both of the two planar faces of the body, for the purpose of supporting the instrument on the drafting surface and minimizing the surface area of contact between the body of the instrument and the drafting surface. The number of glide points provided is selected to comprise the minimum number consistent with stability, in order to minimize the surface area of contact between the body of the instrument and the drafting surface. The glide points of the instrument serve to reduce the friction associated with sliding of the instrument on the drafting surface for the dual purpose of achieving the smoothest possible movement of the instrument and of substantially preventing smearing or other frictionally produced defacement of the drafting work. Most efficient use of the 30/60 degree triangle embodiment requires that it be reversible from face to face, and providing glide points on both faces of the body of that embodiment of the invention allows it to be readily reversible and usable from either side. The 45 degree triangle embodiment of the invention may be efficiently used without the need to reverse the instrument from one face to the other, so the glide points may be provided on only one face of that embodiment.

To further facilitate movement and control during use, each embodiment of the instrument of the invention further includes a handle disposed near the right angle corner of the instrument. In the 45 degree triangle embodiment, where reversibility from face to face of the instrument is not necessary, if glide points are provided on only one face, the handle may be fixedly interconnected to the body of the instrument so that it extends outwardly from the face opposite the face to which the glide points are interconnected.

In the triangle embodiments for which reversibility is desired, the handle is accordingly adapted to be reversible as well, and extends through an aperture disposed through the body of the instrument. The handle comprises a shaft extending through such aperture and pair of end caps each interconnected to a different end of the shaft. The shaft is of sufficiently smaller cross-sectional dimension than the associated aperture to allow it to slide freely through such aperture, and the end caps are of sufficiently larger dimension than the aperture to retain the shaft of the handle therein. Each end cap is no thicker than the distance of extension of each of the glide points from the respective face of the body of the instrument, so that each end cap will lie within the space between the respective face of the instrument and the drafting surface and will not interfere with movement of the instrument over the drafting surface. This interactive relationship between the handle and the glide points eliminates the need to provide a recess in the body of the instrument to receive each end cap, which requires an increased body thickness, or to provide a more complex and costly bushing to retain the shaft of the handle. Any convenient configuration of the shaft and the end caps of the handle, and of its associated aperture, may be used, but use of the instrument is substantially more efficient if the cross-sectional configuration prevents rotation of the handle relative to its associated aperture.

The drafting instrument of the invention may be constructed of any suitably strong and rigid material, but use of a transparent material allows the draftsman to view the portion of the drafting work under the instrument and contributes to its efficiency of use.

Each separate structural feature of the drafting instrument of the invention provides certain distinct efficiencies in use of the instrument, and such features are complimentary in combination, creating a highly efficient triangular instrument for the performance of drafting work. The use of glide points to raise the instrument above the drafting surface allows a draftsman to substantially eliminate problems of smearing of ink or graphite and the build-up of graphite and eraser residue between the instrument and a horizontal bar. The raising of the body of the instrument above the drafting surface allows a draftsman to scribe an ink line along any desired edge without any necessity for an undercut inking edge, eliminating the need for "cross-handed" operation, and eliminating the problem of ink being drawn between the drafting surface and the face of the instrument by capillary action. The reduced friction afforded by the glide points and the placement of the handle of the instrument allow a draftsman to firmly grasp and control the instrument with his hands in an optimal position for the efficient performance of drafting work and efficient movement and, in the appropriate embodiments, reversal of the instrument from face to face with minimal lost motion. While the incremental increase in efficiency of each movement may be small, over the course of preparation of a complete drafting work the aggregate increase in efficiency is substantial.

The structure of the triangular drafting instruments of the invention will now be described in detail, with reference to the accompanying drawing figures.

DETAILED DESCRIPTION OF THE INVENTION

Figure 1:
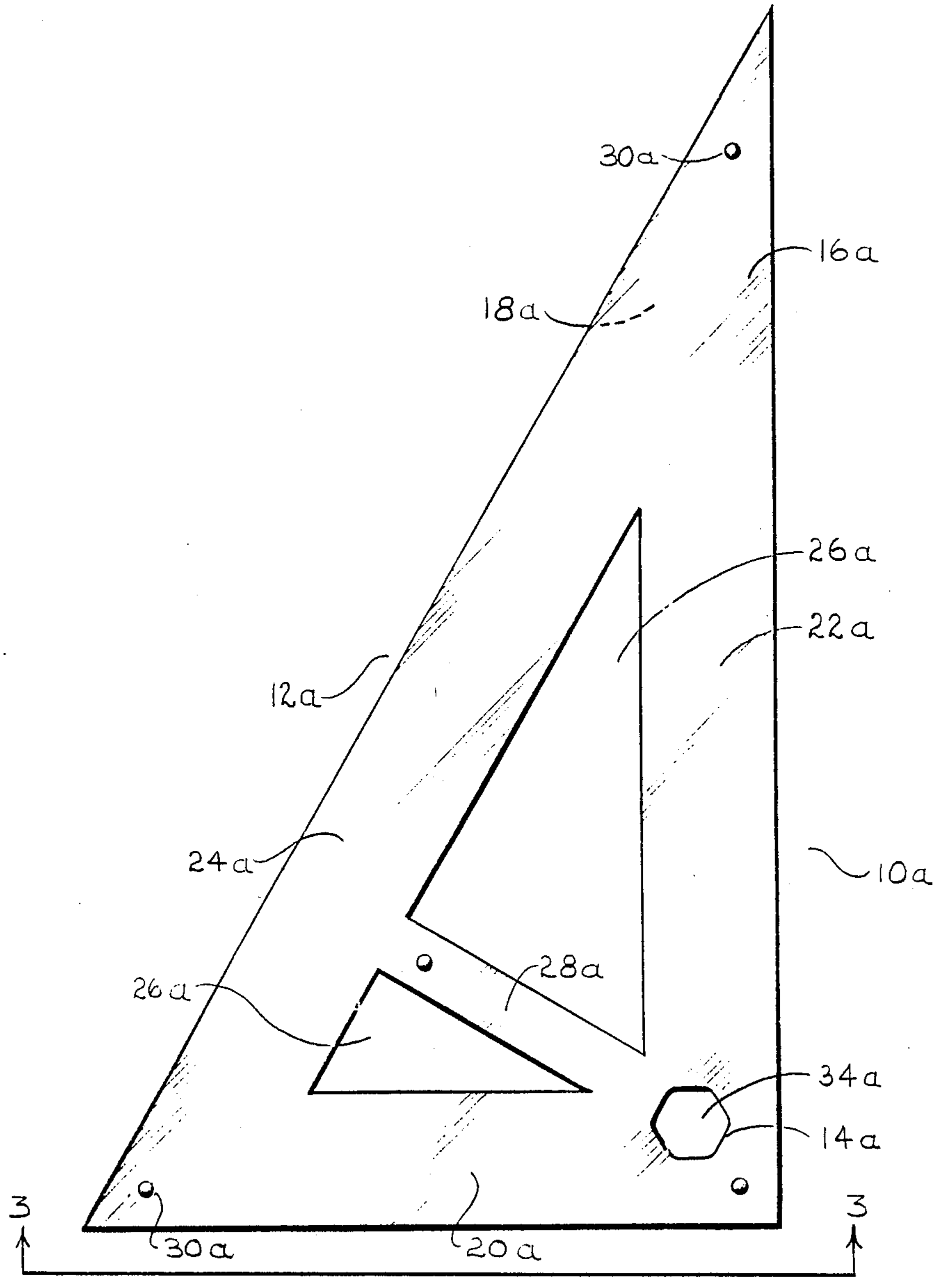
FIG. 1 is a plan view of the preferred 30/60 degree triangle embodiment of the drafting instrument of the invention.

With reference to the three accompanying figures, each of the preferred embodiments of the drafting instrument of the invention is generally designated by reference numeral 10. In the following description of the preferred embodiments of the invention, and in the drawing figures, "a" is used in conjunction with the reference numerals to designate components of the 30/60 degree triangle embodiment, and "b" is used in conjunction with the reference numerals to designate matching components of the 45 degree triangle embodiment. When reference numerals are used without the specific embodiment identifiers in either or both the written description and the drawing figures it is to be understood that the description is appropriate to both embodiments without distinction between them. As an example, reference numeral 10 generally designates the drafting instrument of the invention, reference numeral **10*a* specifically designates the 30/60 degree triangle embodiment, and reference numeral 10*b*** specifically designates the 45 degree triangle embodiment.

With that preamble, the preferred embodiment of the drafting instrument of the invention, 10, will be seen and understood to comprise a triangular integrally formed substantially planar body 12, and a handle assembly 14 having a longitudinal axis perpendicular to the plane of body 12. Body 12, which has an upper face 16 and a lower face 18, includes three elongate perimeter legs, being a base leg 20, a vertical leg 22, and a hypotenuse leg 24, interconnected end to end to form the triangular configuration of body 12 and to define a triangular open space 26 in the interior of body 12. Base leg 20 intersects vertical leg 22 and is interconnected thereto at a 90 degree angle. In the preferred embodiment of drafting instrument 10, legs 20, 22, and 24 are of the same width within each disclosed embodiment, and each of said legs is of the same width throughout its length. Body 12 further includes an elongate interior leg 28, extending from the intersection of legs 20 and 22 across open space 26 to intersect leg 24 at a right angle. In the preferred embodiment of drafting instrument 10, interior leg 28 is of the same width throughout its length, with the width of leg 28 less than the width of legs 20, 22, and 24. In addition to providing interior complimentary angles, as discussed below, interior leg 28 serves as a brace, effectively stiffening body 12, thus allowing the width of legs 20, 22, and 24 to be minimized without loss of the desired degree of rigidity of body 12, and allowing the length of interior leg 28 to be maximized. Minimizing the width of legs 20, 22, and 24 results in minimization of the total weight of drafting instrument 10, making the instrument easier for a draftsman to move and position as compared to a heavier instrument.

Body 12 of drafting instrument 10 additionally includes a plurality of glide points 30 disposed on one or both of faces 16 and 18 and extending outwardly therefrom a short distance, for the purpose of raising body 12 of drafting instrument 10 above the drafting surface upon which it is used. In the preferred embodiment of drafting instrument 10, each of glide points 30 is configured as a hemisphere with a radius of approximately one sixteenth inch, and is integrally formed with body 12, but any convenient configuration, size, and means of interconnection of glide points 30 to body 12 may be used within the spirit of the invention. The distance of extension of each of glide points 30 from the respective face of body 12 must be equal to ensure stability of drafting instrument 10 upon a drafting surface, and it is preferred that such distance of extension not exceed the thickness of body 12.

Figure 2:
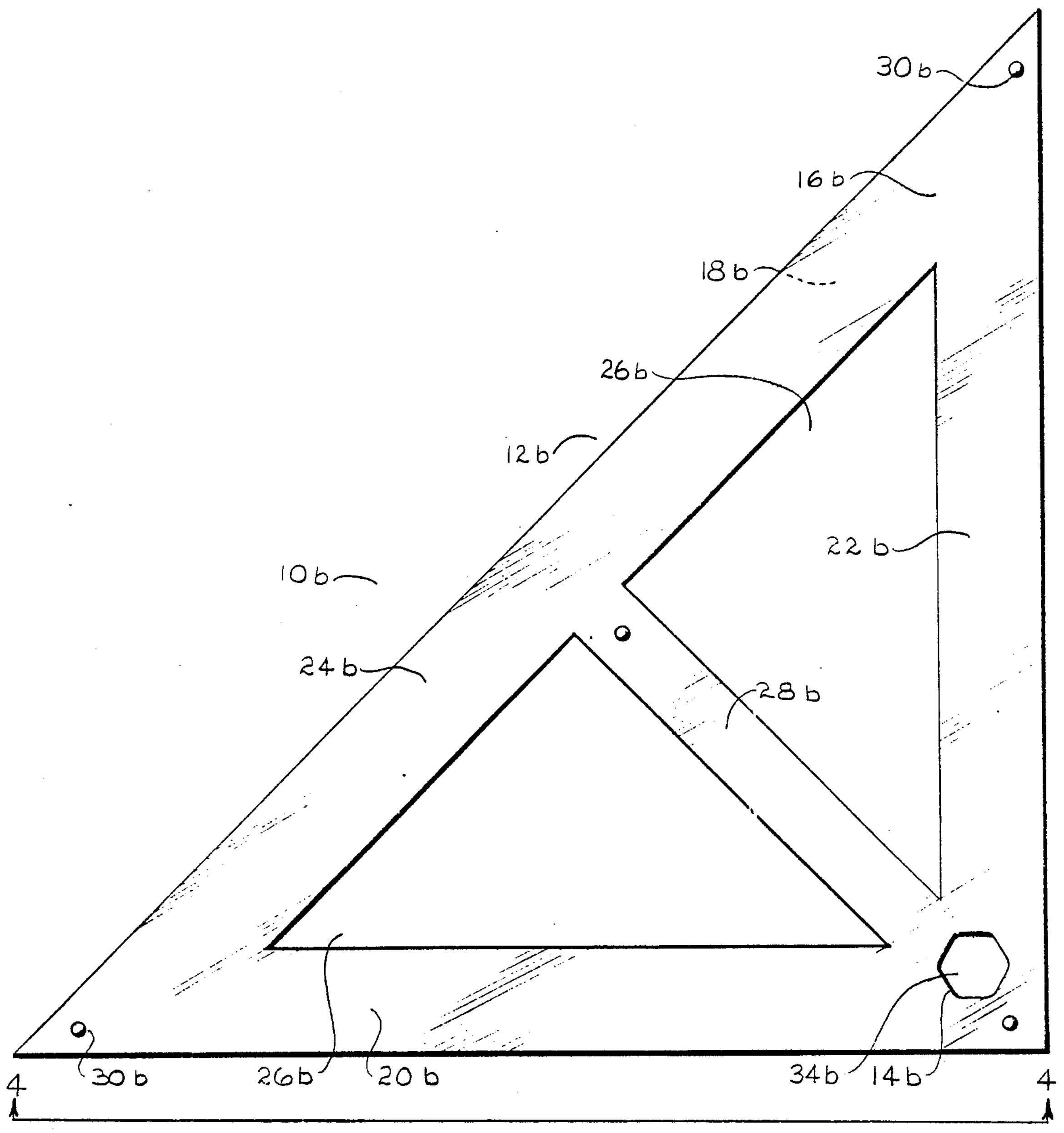
FIG. 2 is a plan view of the preferred 45 degree triangle embodiment of the drafting instrument of the invention.
Figure 3:
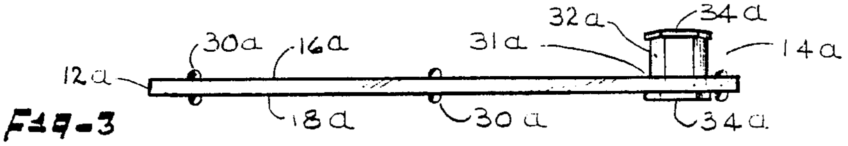
FIG. 3 is an elevation, or edge, view of the preferred 30/60 degree triangle embodiment of the drafting instrument of the invention, along line 3—3 of FIG. 1.

In the preferred embodiments of the invention, both adaptation 10*a* and adaptation 10*b* are made to be reversible from face to face, and glide points 30 are provided on each face of body 12, equally divided between upper face 16 and lower face 18. In the preferred embodiments the total number of glide points 30 is eight, disposed in paired opposing relationship as depicted in FIGS. 1, 2, and 3.

In the reversible embodiments of the invention, handle assembly 14 comprises a shaft 32 and a pair of end caps 34 each interconnected to a different end of shaft 32. Shaft 34 is disposed through an aperture 36 penetrating body 12 near the intersection of leg 20 and leg 22, with the longitudinal axis of shaft 32 perpendicular to the plane of body 12. The cross-sectional dimension of shaft 32 is sufficiently smaller than the cross-sectional dimension of aperture 36 to allow shaft 32 to freely slide through aperture 36, and shaft 32 is of sufficient length to allow it to be comfortably grasped with the fingers. Shaft 32 is retained within aperture 36 by end caps 34, which are of larger dimension than aperture 36. The thickness of each of end caps 34 is preferably less than or equal to the distance of extension of each of glide points 30 from the respective face of body 12, such that each end cap 34 will lie within the space between the respective face of body 12 and a drafting surface upon which drafting instrument 10 is placed, and will not interfere with movement or support of the instrument on such surface. The end caps 34 may be treated as independent of glide points 30, as in the preferred embodiments disclosed, or, if constructed to be of equal thickness with glide points 30 in an alternative embodiment, end caps 34 function to provide support for drafting instrument 10 in the same manner as and in cooperation with glide points 30. In that alternative embodiment, glide points 30 in immediate proximity to handle assembly 14 may be omitted, and their function performed by end caps 34. In the preferred embodiment of drafting instrument 10*a*, shaft 32 and aperture 36 are hexagonal in cross-section, but any convenient configuration may be used It is, however, preferred that shaft 32 and aperture 36 be configured and sized so as to prevent rotation of shaft 32 within aperture 36.

Building upon the foregoing description, a description of the specific adaptation of each of the embodiments of the drafting instrument of the invention may be provided. In the adaptation of drafting instrument 10 to provide the 30/60 degree triangle embodiment 10*a*, the lengths of legs 20*a*, 22*a*, and 24*a* are proportioned such that a 30 degree angle is formed at the intersection of leg 22*a* and leg 24*a*, and a 60 degree angle is formed at the intersection of leg 20*a* and leg 24*a*. Interior leg 28*a*, which intersects leg 24*a* at a 90 degree angle, divides interior space 26*a* into two 30/60 degree right triangular spaces in complimentary relationship to the 30/60 degree right triangle defined by legs 20*a*, 22*a*, and 24*a*. With this configuration a draftsman may scribe a line along one of the edges of interior leg 28*a* at the complimentary 90 degree angle to a line scribed along one of the edges of leg 24*a* without the need to rotate or flip the drafting instrument. Since much drafting work requires the repeated scribing of such complimentary lines, the aggregate increase in drafting efficiency through the course of creation of an entire work can be substantial.

In the 45 degree triangle embodiment 10*b* of the drafting instrument of the invention, legs 20*b* and 22*b* are of the same length, such that a 45 degree angle is formed at the intersection of each said leg and leg 24*b*. Interior leg 28*b* intersects leg 24*b* at a 90 degree angle, dividing interior space 26*b* into two complimentary 45 degree triangles, allowing a draftsman to scribe lines at complimentary angles in the same manner as with 30/60 degree triangle 10*a*.

Figure 4:
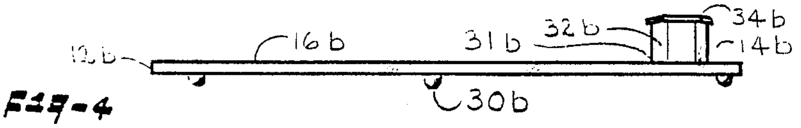
FIG. 4 is an elevation, or edge, view of an alternative, non-reversible, 45 degree triangle embodiment of the drafting instrument of the invention, along line 4—4 of FIG. 2.

Adaptation 10*b* of the drafting instrument of the invention is preferably reversible as described above. However, due to its inherent symmetry, reversibility of a 45 degree triangular drafting instrument is not essential to efficient use and, accordingly, drafting instrument 10*b* of the invention may be made nonreversible in an alternative embodiment, as illustrated in FIG. 4, contributing to ease and economy of its construction.

In that alternative embodiment of drafting instrument 10*b*, glide points 30*b* are provided only on the lower face 18*b* of body 12*b*. In this alternative embodiment of drafting instrument 10*b*, the number of such glide points 30*b* is four, with one of said glide points underlying handle assembly 14*b*.

Handle assembly 14*b* of the alternative, non-reversible 45 degree triangle embodiment, similarly to the preferred handle assembly 14, includes shaft 32*b* and one end cap 34*b*, but the second end cap and aperture 36 are omitted. Shaft 32*b* is of shorter length than is shaft 32*a* by approximately the thickness of body 12*a*, and shaft 32*b* is interconnected at one end to upper face 16*b* of body 12*b*. End cap 34*b* is interconnected to the opposite end of shaft 32*b*.

The foregoing detailed description of the preferred embodiment of the drafting instrument of the invention is illustrative, and not for purposes of limitation. The drafting instrument of the invention is susceptible to various modifications and alternative embodiments without departing from the scope and spirit of the invention as claimed.

What is claimed is:

1. A drafting instrument comprising:

a triangular integrally formed planar body having an upper face and a lower face, having three elongate perimeter legs being a first, base leg with first and second ends, a second, upright leg with first and second ends, and a third, hypotenuse leg with first and second ends, each of said legs being of equal width throughout its length, with the second end of said base leg interconnected to the first end of said upright leg at a right angle, the second end of said upright leg interconnected to the first end of said hypotenuse leg, and the second end of said hypotenuse leg interconnected to the first end of said base leg, forming the triangular configuration of the drafting instrument, the width of said legs being such that an open space is defined in the interior of said body;

an elongate interior leg of equal width throughout its length, extending in the plane of said body from the interconnection of said base leg and said upright leg to said hypotenuse leg intermediate its first and second ends, and interconnected therebetween such that a right angle is formed between said interior leg and said hypotenuse leg;

a plurality of glide points extending outwardly from at least one of said upper and lower faces of said body a short distance so as to contact a planar surface upon which the drafting instrument is positioned with the planar body of the drafting instrument parallel to said planar surface, and suspend said planar body above said planar surface in stable parallel relation thereto; and a handle assembly including an aperture penetrating said body near the interconnection between said base leg and said upright leg, a shaft to be received through said aperture in sliding relation therewith and a pair of end caps each interconnected to a different end of said shaft, each of said end caps having a thickness equal to or less than the distance of extension of each of said glide points from said body and having a dimension parallel to the plane of said body greater than the dimension of said aperture in the plane of said body, so as to retain said shaft within said aperture.

2. The drafting instrument of claim 1, wherein the lengths of said perimeter legs are adapted such that a 30 degree angle is formed between said upright leg and said hypotenuse leg, and a 60 degree angle is formed between said hypotenuse leg and said base leg.

3. The drafting instrument of claim 2, wherein said glide points extend outwardly from both said upper face and from said lower face of said body and the number of said glide points extending outwardly from said upper face is equal to the number of said glide points extending outwardly from said lower face.

4. The drafting instrument of claim 2, wherein said glide points extend outwardly from both said upper face and from said lower face of said body.

5. The drafting instrument of claim 1, wherein said base leg, said upright leg, and said hypotenuse leg are of equal width, and the width of said interior leg is less than the width of such perimeter legs.

6. The drafting instrument of claim 1, wherein said body is constructed of a transparent plastic material.

7. The drafting instrument of claim 1, wherein the length of said base leg and the length of said upright leg are equal, such that a 45 degree angle is formed between said upright leg and said hypotenuse leg and a 45 degree angle is formed between said hypotenuse leg and said base leg.

8. The drafting instrument of claim 7, wherein said glide points extend outwardly from both said upper face and from said lower face of said body and the number of said glide points extending outwardly from said upper face is equal to the number of said glide points extending outwardly from said lower face.

9. The drafting instrument of claim 7, wherein said glide points extend outward from both said upper face and from said lower face of said body.

10. The drafting instrument of claim 7, wherein said glide points extend outwardly from only said lower face of said body.

11. In a triangular substantially planar drafting instrument having a body with an upper face and a lower face, the body including a base leg, an upright leg, and a hypotenuse leg interconnected end to end to define an open space in the interior of the body, with the interconnection between the base leg and upright leg forming a 90 degree angle, the interconnection between the upright leg and the hypotenuse leg forming a 30 degree angle, and the interconnection between the hypotenuse leg and the base leg forming a 60 degree angle, the combined improvements comprising:

an interior leg interconnected between the inside corner formed by the interconnection between the base leg and the upright leg of the body of the drafting instrument and the hypotenuse leg of said body intermediate its two ends, with said interior leg disposed such that a 90 degree angle is formed between said interior leg and said hypotenuse leg;

a plurality of glide points divided between the upper and lower faces of said body and interconnected thereto such that each of said glide points extends a short distance from the respective face of the drafting instrument, with respective glide points disposed on each face so as to provide a stable suspension of the drafting instrument above a substantially planar surface upon which the drafting instrument is placed with the plane of the body of the drafting instrument parallel to the plane of said surface; and a reversible handle assembly including a handle aperture penetrating said body near the interconnection between said base leg and said upright leg with the axis of said aperture perpendicular to the plane of the drafting instrument, a handle shaft having two ends and being substantially greater in length than the thickness of said body between its respective faces, said handle shaft extending through said aperture in sliding relation therewith along the longitudinal axis of said handle shaft, and a pair of substantially planar end caps each interconnected to a different end of said handle shaft with the plane of each of said end caps parallel to the plane of said body, with the thickness of each of said end caps equal to or less than the distance of extension of each of said glide points from the respective face of said body and with the width of each of said end caps in the plane thereof greater than the width of said handle aperture whereby said end caps retain said handle shaft within said aperture.

12. The triangular substantially planar drafting instrument of claim 11, wherein the body of the drafting instrument, said interior leg, and said glide points are formed as a one piece construction of a substantially transparent plastic material.

13. The triangular substantially planar drafting instrument of claim 11, wherein the number of said glide points is eight, said glide points are evenly divided between the upper and lower faces of said body and are disposed in paired opposed relationship thereon.

14. The triangular substantially planar drafting instrument of claim 11, wherein said handle aperture is noncircular in configuration and the cross-sectional configuration and cross-sectional dimensions of said handle shaft are adapted such that said handle shaft is prevented from rotating about its longitudinal axis relative to said handle aperture while allowed to slide along its longitudinal axis relative to said handle aperture.

15. In a triangular substantially planar drafting instrument having a body with an upper face and a lower face, the body including a base leg, an upright leg, and a hypotenuse leg interconnected end to end to define an open space in the interior of the body, with the interconnection between the base leg and upright leg forming a 90 degree angle, the interconnection between the upright leg and the hypotenuse leg forming a 45 degree angle, and the interconnection between the hypotenuse leg and the base leg forming a 45 degree angle, the combined improvements comprising:

an interior leg interconnected between the inside corner formed by the interconnection between the base leg and the upright leg of the body of the drafting instrument and the hypotenuse leg of said body intermediate its two ends, with said interior leg disposed such that a 90 degree angle is formed between said interior leg and said hypotenuse leg;

a plurality of glide points divided between the upper and lower faces of said body and interconnected thereto such that each of said glide points extends a short distance from the respective face of the drafting instrument, with respective glide points disPosed on each face so as to provide a stable suspension of the drafting instrument above a substantially planar surface upon which the drafting instrument is placed with the plane of the body of the drafting instrument parallel to the plane of said surface; and a reversible handle assembly including a handle aperture penetrating said body near the interconnection between said base leg and said upright leg with the axis of said aperture perpendicular to the plane of the drafting instrument, a handle shaft having two ends and being substantially greater in length than the thickness of said body between its respective faces, said handle shaft extending through said aperture in sliding relation therewith along the longitudinal axis of said handle shaft, and a pair of substantially planar end caps each interconnected to a different end of said handle shaft with the plane of each of said end caps parallel to the plane of said body; with the thickness of each of said end caps equal to or less than the distance of extension of each of said glide points from the respective face of said body and with the width of each of said end caps in the plane thereof greater than the width of said handle aperture whereby said end caps retain said handle shaft within said aperture.

16. The triangular substantially planar drafting instrument of claim 15, wherein the body of the drafting instrument, said interior leg, and said glide points are formed as a one piece construction of a substantially transparent plastic material.

17. The triangular substantially planar drafting instrument of claim 15, wherein the number of said glide points is eight, said glide points are evenly divided between the upper and lower faces of said body and are disposed in paired opposed relationship thereon.

18. The triangular substantially planar drafting instrument of claim 15, wherein said glide points extend outwardly from only the lower face of said body, said handle assembly is fixed rather than reversible, with said handle aperture being omitted, and wherein said handle assembly includes a handle shaft having two ends and being substantially greater in length than the thickness of said body, said shaft being interconnected at one of its ends to the upper face of said body near the interconnection of the base leg and the upright leg of said body with the longitudinal axis of said handle shaft perpendicular to the plane of said body, and said handle assembly further includes an end cap of greater width than the cross-sectional dimension of said handle shaft, interconnected to the end of said handle shaft opposite the interconnection of said handle shaft to said body.

19. The triangular substantially planar drafting instrument of claim 15, wherein said handle aperture is noncircular in configuration and the cross-sectional configuration and cross-sectional dimensions of said handle shaft are adapted such that said handle shaft is prevented from rotating about its longitudinal axis relative to said handle aperture while allowed to slide along its longitudinal axis relative to said handle aperture.

* * * * *